US005787302A

United States Patent [19]
Hampapuram et al.

[11] Patent Number: 5,787,302
[45] Date of Patent: Jul. 28, 1998

[54] SOFTWARE FOR PRODUCING INSTRUCTIONS IN A COMPRESSED FORMAT FOR A VLIW PROCESSOR

[75] Inventors: Hari Hampapuram, Sunnyvale; Yen C. Lee, San Jose; Eino Jacobs, Palo Alto; Michael Ang, Santa Clara, all of Calif.

[73] Assignee: Philips Electronic North America Corporation, New York, N.Y.

[21] Appl. No.: 649,731

[22] Filed: May 15, 1996

[51] Int. Cl.$^6$ .................................................. G06F 7/00
[52] U.S. Cl. ................................. 395/800.24; 395/379
[58] Field of Search ............................ 395/800.24, 379

[56] References Cited

U.S. PATENT DOCUMENTS

| | | |
|---|---|---|
| 4,437,149 | 3/1984 | Pomerene et al. |
| 5,057,837 | 10/1991 | Colwell et al. ................. 341/55 |
| 5,179,680 | 1/1993 | Colwell et al. |
| 5,632,024 | 5/1997 | Yajima ........................... 395/381 |
| 5,652,852 | 7/1997 | Yokota ........................... 395/384 |

FOREIGN PATENT DOCUMENTS

WO9519006  7/1995  WIPO ................. G06F 15/78

OTHER PUBLICATIONS

Philips hopes to displace DSPs with VLIW: TriMedia processors aimed at future multimedia embedded apps. Brian Case, Microprocessor Report vol. 8, nr 16, p12(4) Dec. 5, 1994.

Wang et al., "The Feasibility of Using Compression to Increase Memory System Performance", Proc. 2nd Int. Workshop on Modeling Analysis, and Simulation of Computer and Telecommunications Systems, pp. 107–113.

Schroder et al., "Program Compression on the Instruction Systolic Array", Parallel Computing, vol. 17, 1991, No. 2–3, pp. 207–219.

Wolfe et al., "Executing Compressed Programs on An Embedded RISC Architecture", J. Computer and Software Engineering, vol. 2, No. 3, pp. 315–327, (1994).

Kozuch et al., "Compression of Embedded System Programs", Proc. 1994, IEEE Inter. Conf. on computer Design: VLSI in Computers and Processors (Oct. 10–12, 1994, Cambridge, MA,) pp. 270–277.

Russ, *An Information–Theoretic Approach To Analysis of Computer Archetectures and Compression of Instruction Memory Usage*, UMI Dissertation Services, Entire Book.

*Primary Examiner*—Eric Coleman
*Attorney, Agent, or Firm*—Anne E. Barschall

[57] ABSTRACT

Software creates a compressed instruction format for a VLIW processor which allows greater efficiency in use of cache and memory. Instructions are byte aligned and variable length. Branch targets are uncompressed. Format bits specify how many issue slots are used in a following instruction. NOPS are not stored in memory. Individual operations are compressed according to features such as whether they are resultless, guarded, short, zeroary, unary, or binary. Instructions are stored in compressed form in memory and in cache. Instructions are decompressed on the fly after being read out from cache.

24 Claims, 15 Drawing Sheets

Microfiche Appendix Included
(2 Microfiche, 66 Pages)

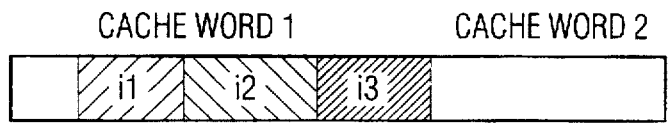
FIG. 2a
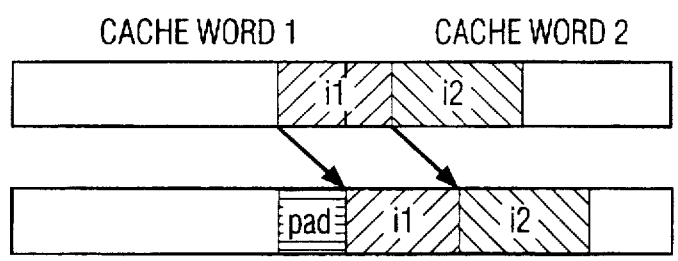
FIG. 2b
FIG. 2c
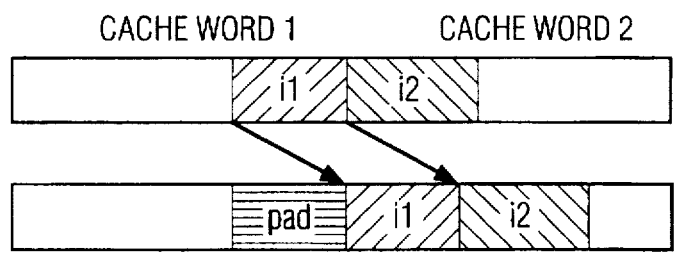
FIG. 2d
FIG. 2e

|  | 24-bit operation part | | | | 2-bit part | | |
|---|---|---|---|---|---|---|---|
|  | bit position | | | | | | |
| name | 0-6 | 7-13 | 14-20 | 21-23 | 24-25 | Extension | Size |
| 26-format: | | | | | | | |
| <binary-unguarded-short> | src1[0:6] | src2[0:6] | dst[0:6] | opcode[0:2] | opcode[3:4] | 26-34-41 | 26 |
| <unary-param7-unguarded-short> | src1[0:6] | param[0:6] | dst[0:6] | opcode[0:2] | opcode[3:4] | | 26 |
| <binary-unguarded-param7-resultless-short> | src1[0:6] | src2[0:6] | param[0:6] | opcode[0:2] | opcode[3:4] | | 26 |
| <unary-short> | src1[0:6] | dst[0:6] | guard[0:6] | opcode[0:2] | opcode[3:4] | | 26 |
| 34-format: | | | | | | | |
| <binary-short> iadd, etc. | src1[0:6] | src2[0:6] | guard[0:6] | opcode[0:2] | opcode[3:4] | dst[0:6] | 34 |
| <unary-param-7-short> | src1[0:6] | param[0:6] | guard[0:6] | opcode[0:2] | opcode[3:4] | dst[0:6] 0 | 34 |
| <binary-param7-resultless-short> | src1[0:6] | src2[0:6] | dst[0:6] | opcode[0:2] | opcode[3:4] | param[0:6] 0 | 34 |
| <binary-unguarded> | src1[0:6] | src2[0:6] | dst[0:6] | opcode[0:2] | opcode[3:4] | opcode[5:7]XL011 | 34 |
| <binary-resultless> | src1[0:6] | src2[0:6] | guard[0:6] | opcode[0:2] | opcode[3:4] | opcode[5:7]X1001 | 34 |
| <unary-param7-un-guarded> | src1[0:6] | param[0:6] | dst[0:6] | opcode[0:2] | opcode[3:4] | opcode[5:7]SL111 | 34 |
| <unary> | src1[0:6] | dst[0:6] | guard[0:6] | opcode[0:2] | opcode[3:4] | opcode[5:7]XL101 | 34 |

FIG. 5a

| 42-format: | | | | | |
|---|---|---|---|---|---|
| <binary-param7-resultless> | src1[0:6] | src2[0:6] | guard[0:6] | opcode[0:2] | opcode[3:4] | opcode[5:7]SXX100param[0:6] | 42 |
| <binary> | src1[0:6] | src2[0:6] | guard[0:6] | opcode[0:2] | opcode[3:4] | opcode[5:7]XL0101 dst[0:6] | 42 |
| <unary-param7> | src1[0:6] | param[0:6] | guard[0:6] | opcode[0:2] | opcode[3:4] | opcode[5:7]SL1101 dst[0:6] | 42 |
| <zeroary-param32> | param[7:13] | param[0:6] | dst[0:6] | param[14:16] | param[17:18] | param[19:23]XX1 param[24:31] | 42 |
| <zeroary-param32-resultless> | param[7:13] | param[0:6] | guard[0:6] | param[14:16] | param[17:18] | param[19:23]000 param[24:31] | 42 |
| <zeroary-param32-resultless> | param[7:13] | param[0:6] | guard[0:6] | param[14:16] | param[17:18] | param[19:23]100 param[24:31] | 42 |

Note:
S: signed/unsigned format bit for parametric operations; S=1 if signed, S=0 if unsigned
L: latency format bit; L=0 if (latency=1 and this is not a resultless operation) else L=1
X: undefined value

FIG. 5b

SOFTWARE FOR PRODUCING INSTRUCTIONS IN A COMPRESSED FORMAT FOR A VLIW PROCESSOR

BACKGROUND OF THE INVENTION a. Field of the invention

The invention relates to VLIW (Very Long Instruction Word) processors and in particular to instruction formats for such processors and apparatus for processing such instruction formats.

b. Background of the invention

VLIW processors have instruction words including a plurality of issue slots. The processors also include a plurality of functional units. Each functional unit is for executing a set of operations of a given type. Each functional unit is RISC-like in that it can begin an instruction in each machine cycle in a pipe-lined manner. Each issue slot is for holding a respective operation. All of the operations in a same instruction word are to be begun in parallel on the functional unit in a single cycle of the processor. Thus the VLIW implements fine-grained parallelism.

Thus, typically an instruction on a VLIW machine includes a plurality of operations. On conventional machines, each operation might be referred to as a separate instruction. However, in the VLIW machine, each instruction is composed of operations or no-ops (dummy operations).

Like conventional processors, VLIW processors use a memory device, such as a disk drive to store instruction streams for execution on the processor. A VLIW processor can also use caches, like conventional processors, to store pieces of the instruction streams with high bandwidth accessibility to the processor.

The instruction in the VLIW machine is built up by a programmer or compiler out of these operations. Thus the scheduling in the VLIW processor is software-controlled.

The VLIW processor can be compared with other types of parallel processors such as vector processors and superscalar processors as follows. Vector processors have single operations which are performed on multiple data items simultaneously. Superscalar processors implement fine-grained parallelism, like the VLIW processors, but unlike the VLIW processor, the superscalar processor schedules operations in hardware.

Because of the long instruction words, the VLIW processor has aggravated problems with cache use. In particular, large code size causes cache misses, i.e. situations where needed instructions are not in cache. Large code size also requires a higher main memory bandwidth to transfer code from the main memory to the cache.

Large code size can be aggravated by the following factors.

In order to fine tune programs for optimal running, techniques such as grafting, loop unrolling, and procedure inlining are used. These procedures increase code size.

Not all issue slots are used in each instruction. A good optimizing compiler can reduce the number of unused issue slots; however a certain number of no-ops (dummy instructions) will continue to be present in most instruction streams.

In order to optimize use of the functional units, operations on conditional branches are typically begun prior to expiration of the branch delay, i.e. before it is known which branch is going to be taken. To resolve which results are actually to be used, guard bits are included with the instructions.

Larger register files, preferably used on newer processor types, require longer addresses, which have to be included with operations.

A scheme for compression of VLIW instructions has been proposed in U.S. Pat. Nos. 5,179,680 and 5,057,837. This compression scheme eliminates unused operations in an instruction word using a mask word, but there is more room to compress the instruction.

SUMMARY OF THE INVENTION

It is an object of the invention to compress VLIW instructions.

This object is met by compression software. The compression software includes code means for receiving a compiled and linked object module and code means for compressing the object module. The compressing code produces a second object module for storing. The second object module includes a stored instruction. The instruction comprises a plurality of operations. Each operation is compressed according to a compression scheme which assigns a compressed operation length to that operation. The compressed operation length is chosen from a plurality of finite lengths. The finite lengths include at least two non-zero lengths. Which of the finite lengths is chosen is dependent upon at least one feature of the operation.

Branch targets are uncompressed. For each instruction, other than a branch target, compression format information is stored in a previous instruction.

Further Information About Technical Background To This APPLICATION

The following prior applications are incorporated herein by reference:

- U.S. application Ser. No. 998,090, filed Dec. 29, 1992 (PHA 21,777), which shows a VLIW processor architecture for implementing fine-grained parallelism;
- U.S. application Ser. No. 142,648 filed Oct. 25, 1993 (PHA 1205), which shows use of guard bits; and
- U.S. application Ser. No. 366,958 filed Dec. 30, 1994 (PHA 21,932) which shows a register file for use with VLIW architecture.

Bibliography of program compression techniques:

- J. Wang et al, "The Feasibility of Using Compression to Increase Memory System Performance", Proc. 2nd Int. Workshop on Modeling Analysis, and Simulation of Computer and Telecommunications Systems, p. 107–113 (Durham, N.C., USA 1994);
- H. Schroder et al., "Program compression on the instruction systolic array", Parallel Computing, vol. 17, n 2–3, Jun. 1991, p. 207–219;
- A. Wolfe et al., "Executing Compressed Programs on an Embedded RISC Architecture", J. Computer and Software Engineering, vol. 2, no. 3, pp 315–27, (1994);
- M. Kozuch et al., "Compression of Embedded Systems Programs", Proc. 1994 IEEE Int. Conf. on Computer Design: VLSI in Computers and Processors (Oct. 10–12, 1994, Cambridge Mass., USA) pp. 270–7.

Typically the approach adopted in these documents has been to attempt to compress a program as a whole or blocks of program code. Moreover, typically some table of instruction locations or locations of blocks of instructions is necessitated by these approaches.

BRIEF DESCRIPTION OF THE DRAWING

The invention will now be described by way of non-limitative example with reference to the following figures:

FIG. 1b shows more detail of the CPU of the processor of FIG. 1a.

FIGS. 2a–2e show possible positions of instructions in cache.

FIGS. 5a–5b give a table of compressed instructions formats according to the invention.

DETAILED DESCRIPTION OF THE PREFERRED EMBODIMENT

Figure 1A:
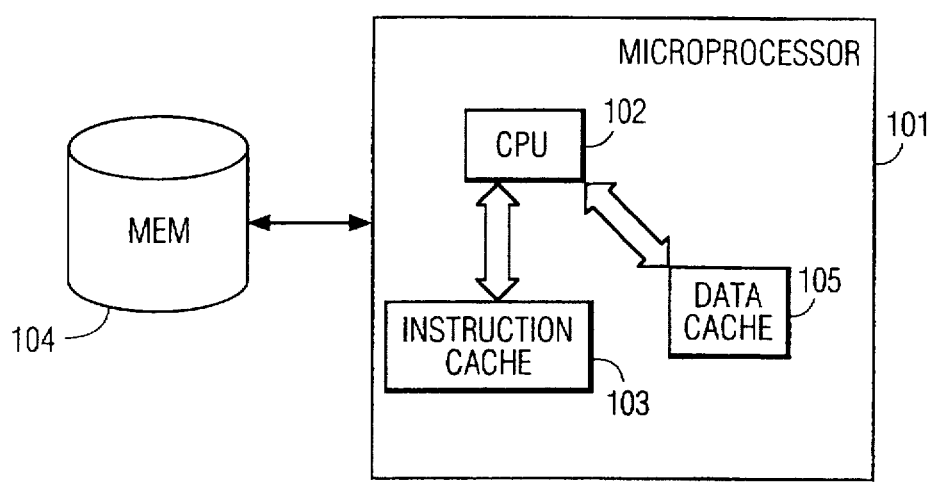
FIG. 1a shows a processor for using the compressed instruction format of the invention.

FIG. 1a shows the general structure of a processor according to the invention. A microprocessor according to the invention includes a CPU 102, an instruction cache 103, and a data cache 105. The CPU is connected to the caches by high bandwidth buses. The microprocessor also contains a memory 104 where an instruction stream is stored.

The cache 103 is structured to have 512 bit double words. The individual bytes in the words are addressable, but the bits are not. Bytes are 8 bits long. Preferably the double words are accessible as a single word in a single clock cycle.

The instruction stream is stored as instructions in a compressed format in accordance with the invention. The compressed format is used both in the memory 104 and in the cache 103.

Figure 1B:
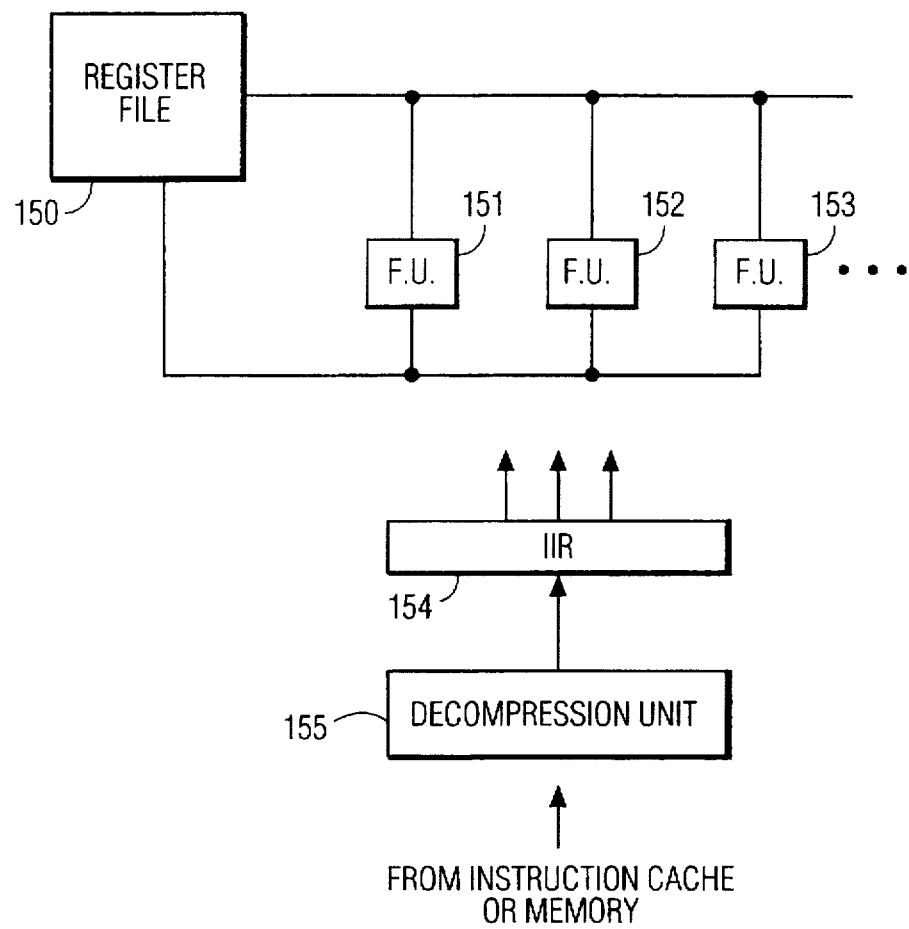

FIG. 1b shows more detail of the VLIW processor according to the invention. The processor includes a multiport register file 150, a number of functional units 151, 152, 153, . . . , and an instruction issue register 152. The multiport register file stores results from and operands for the functional units. The instruction issue register includes a plurality of issue slots for containing operations to be commenced in a single clock cycle, in parallel, on the functional units 151, 152, 153, . . . A decompression unit 155, explained more fully below, converts the compressed instructions from the instruction cache 103 into a form usable by the IIR 154.

COMPRESSED INSTRUCTION FORMAT

1. General Characteristics

The preferred embodiment of the claimed instruction format is optimized for use in a VLIW machine having an instruction word which contains 5 issue slots. The format has the following characteristics

- unaligned, variable length instructions;
- variable number of operations per instruction;
- 3 possible sizes of operations: 26, 34 or 42 bits (also called a 26/34/42 format).

- the 32 most frequently used operations are encoded more compactly than the other operations;
- operations can be guarded or unguarded;
- operations are one of zeroary, unary, or binary, i.e. they have 0, 1 or 2 operands;
- operations can be resultless;
- operations can contain immediate parameters having 7 or 32 bits
- branch targets are not compressed; and
- format bits for an instruction are located in the prior instruction.

2. Instruction Alignment

Except for branch targets, instructions are stored aligned on byte boundaries in cache and main memory. Instructions are unaligned with respect to word or block boundaries in either cache or main memory. Unaligned instruction cache access is therefore needed.

In order to retrieve unaligned instructions, processor retrieves one word per clock cycle from the cache.

As will be seen from the compression format described below, branch targets need to be uncompressed and must fall within a single word of the cache, so that they can be retrieved in a single clock cycle. Branch targets are aligned by the compiler or programmer according to the following rule:

if a word boundary falls within the branch target or exactly at the end of the branch target, padding is added to make the branch target start at the next word boundary Because the preferred cache retrieves double words in a single clock cycle, the rule above can be modified to substitute double word boundaries for word boundaries.

The normal unaligned instructions are retrieved so that succeeding instructions are assembled from the tail portion of the current word and an initial portion of the succeeding word. Similarly, all subsequent instructions may be assembled from 2 cache words, retrieving an additional word in each clock cycle.

This means that whenever code segments are relocated (for instance in the linker or in the loader) alignment must be maintained. This can be achieved by relocating base addresses of the code segments to multiples of the cache block size.

FIGS. 2a–e show unaligned instruction storage in cache in accordance with the invention.

FIG. 2a shows two cache words with three instructions i1, i2, and i3 in accordance with the invention. The instructions are unaligned with respect to word boundaries. Instructions i1 and i2 can be branch targets, because they fall entirely within a cache word. Instruction i3 crosses a word boundary and therefore must not be a branch target. For the purposes of these examples, however, it will be assumed that i1 and only i1 is a branch target.

FIG. 2b shows an impermissible situation. Branch target i1 crosses a word boundary. Accordingly, the compiler or programmer must shift the instruction i1 to a word boundary and fill the open area with padding bytes, as shown in FIG. 2c.

FIG. 2d shows another impermissible situation. Branch target instruction i1 ends precisely at a word boundary. In this situation, again i1 must be moved over to a word boundary and the open area filled with padding as shown in FIG. 2e.

Branch targets must be instructions, rather than operations within instructions. The instruction compression techniques described below generally eliminate no-ops (dummy instructions). However, because the branch target instructions are uncompressed, they must contain no-ops to fill the issue slots which are not to be used by the processor.

3. Bit and Byte order

Throughout this application bit and byte order are little endian. Bits and bytes are listed with the least significant bits first, as below:

| Bit number  | 0 | ... 8 | ... 16 ... |   |   |
|---|---|---|---|---|---|
| Byte number | 0 |   |   | 1 | 2 |
| address     | 0 |   |   | 1 | 2 |

4. Instruction format

The compressed instruction can have up to seven types of fields. These are listed below. The format bits are the only mandatory field.

The instructions are composed of byte aligned sections. The first two bytes contain the format bits and the first group of 2-bit operation parts. All of the other fields are integral multiples of a byte, except for the second 2-bit operation parts which contain padding bits.

The operations, as explained above can have 26, 34, or 42 bits. 26-bit operations are broken up into a 2-bit part to be stored with the format bits and a 24-bit part. 34-bit operations are broken up into a 2 bit part, a 24-bit part, and a one byte extension. 42-bit operations are broken up into a 2 bit part, a 24 bit part, and a two byte extension.

A. Format bits

These are described in section 5 below. With a 5 issue slot machine, 10 format bits are needed. Thus, one byte plus two bits are used.

B. 2-bit operation parts, first group

While most of each operation is stored in the 24-bit part explained below, i.e. 3 bytes, with the preferred instruction set 24 bits was not adequate. The shortest operations required 26 bits. Accordingly, it was found that the six bits left over in the bytes for the format bit field could advantageously be used to store extra bits from the operations, two bits for each of three operations. If the six bits designated for the 2-bit parts are not needed, they can be filled with padding bits.

C. 24-bit operation parts, first group

There will be as many 24 bit operation parts as there were 2 bit operation parts in the two bit operation parts, first group. In other words, up to three 3 byte operation parts can be stored here.

D. 2 bit operation parts, second group

In machines with more than 3 issue slots a second group of 2-bit and 24-bit operation parts is necessary. The second group of 2-bit parts consists of a byte with 4 sets of 2-bit parts. If any issue slot is unused, its bit positions are filled with padding bits. Padding bits sit on the left side of the byte. In a five issue slot machine, with all slots used, this section would contain 4 padding bits followed by two groups of 2-bit parts. The five issue slots are spread out over the two groups: 3 issue slots in the first group and 2 issue slots in the second group.

E. 24-bit operation parts, second group

The group of 2-bit parts is followed by a corresponding group of 24 bit operation parts. In a five issue slot machine with all slots used, there would be two 24-bit parts in this group.

F. further groups of 2-bit and 24-bit parts

In a very wide machine, i.e. more than 6 issue slots, further groups of 2-bit and 24-bit operation parts are necessary.

G. Operation extension

At the end of the instruction there is a byte-aligned group of optional 8 or 16 bit operation extensions, each of them byte aligned. The extensions are used to extend the size of the operations from the basic 26 bit to 34 or 42 bit, if needed.

```
<instruction> : :=
    <instruction start>
    <instruction middle>
    <instruction end>
    <instruction extension>
<instruction start> : :=
    <Format:2*N>{<padding:1>}V2{<2-bit operation part:2>}V1{<24-
    bit operation part:24>}V1
<instruction middle> : := {{<2-bit operation part:2>}4 {24-bit
    operation part:24>}4}V3
<instruction end> : := {<padding:1>}V5{<2-bit operation
    part:2>}V4  {24-bit operation part:24>}V4
<instruction extension>: :={<operationextension:0/8/16>}S
<padding>: := "0"
```

Wherein the variables used above are defined as follows:
N=the number of issue slots of the machine, N>1
S=the number of issue slots used in this instruction $(0 \leq S \leq N)$
C1=4− (N mod 4)
If $(S \leq C1)$ then V1=S and V2=2*(C1−V1)
If (S>C1) then V1=C1 and V2=0
V3=(S−V1) div 4
V4=(S−V1) mod 4
If (V4>0) then V5=2*(4−V4) else V5=0
Explanation of notation

| | | |
|---|---|---|
| ::=  | means | "is defined as" |
| <field name:number> | | |
| | means | the field indicated before the colon has the number of bits indicated after the colon. |
| {<field name>}number | | |
| | means | the field indicated in the angle brackets and braces is repeated the number of times indicated after the braces |
| "0" | means | the bit "0". |
| "div" | means | integer divide |
| "mod" | means | modulo |
| :0/8/16 | | |
| | means | that the field is 0, 8, or 16 bits long |

Examples of compressed instructions are shown in FIGS. 4a–f.

Figure 4A:
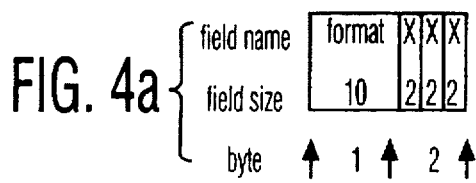
FIGS. 4a–4f illustrate examples of compressed instructions in accordance with the invention.

FIG. 4a shows an instruction with no operations. The instruction contains two bytes, including 10 bits for the format field and 6 bits which contain only padding. The former is present in all the instructions. The latter normally correspond to the 2-bit operation parts. The X's at the top of the bit field indicate that the fields contain padding. In the later figures, an O is used to indicate that the fields are used.

Figure 4B:
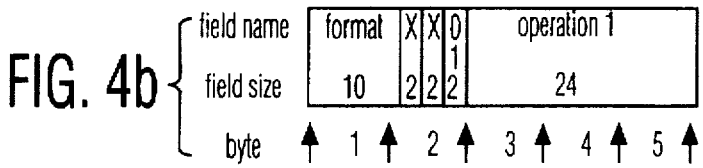

FIG. 4b shows an instruction with one 26-bit operation. The operation includes one 24 bit part at bytes 3–5 and one 2 bit part in byte 2. The 2 bits which are used are marked with an O at the top.

Figure 4C:
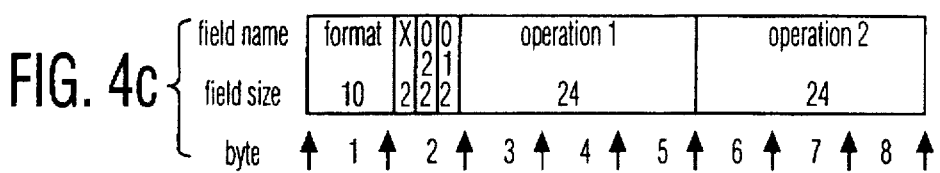

FIG. 4c shows an instruction with two 26-bit operations. The first 26-bit operation has its 24-bit part in bytes 3–5 and its extra two bits in the last of the 2-bit part fields. The second 26-bit operation has its 24-bit part in bytes 6–8 and its extra two bits in the second to last of the 2-bit part fields.

Figure 4D:
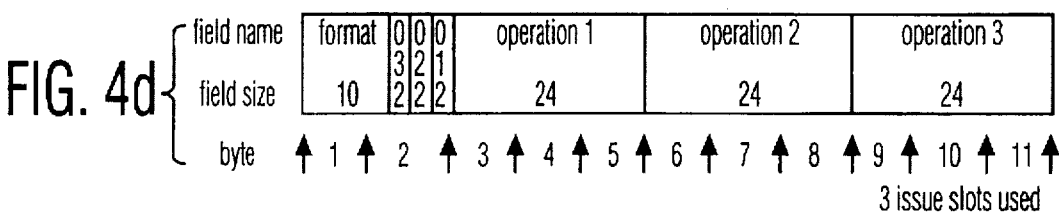

FIG. 4d shows an instruction with three 26-bit operations. The 24-bit parts are located in bytes 3–11 and the 2-bit parts are located in byte 2 in reversed order from the 24-bit parts.

Figure 4E:
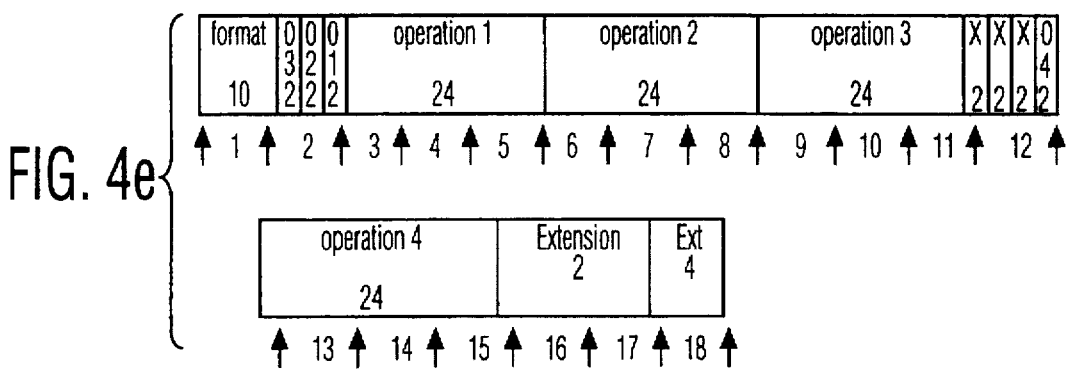

FIG. 4e shows an instruction with four operations. The second operation has a 2 byte extension. The fourth operation has a one byte extension. The 24-bit parts of the operations are stored in bytes 3–11 and 13–15. The 2-bit parts of the first three operations are located in byte 2. The 2-bit part of the fourth operation is located in byte 12. An extension for operation 2 is located in bytes 16–17. An extension for operation 4 is located in byte 18.

Figure 4F:
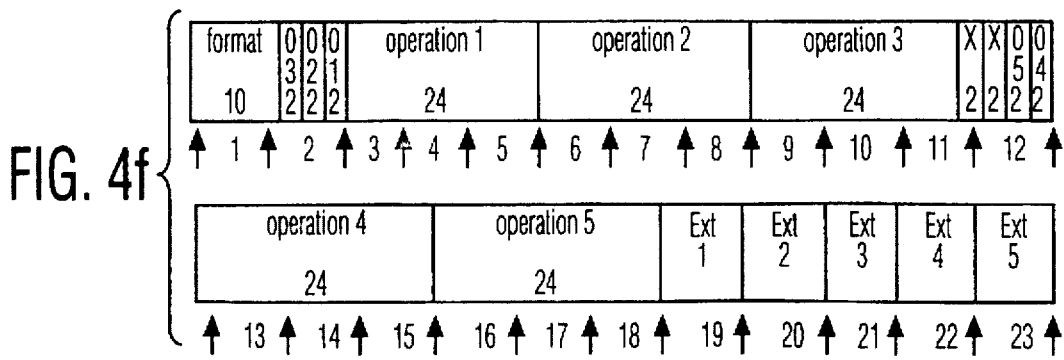

FIG. 4f shows an instruction with 5 operations each of which has a one byte extension. The extensions all appear at the end of the instruction.

While extensions only appear after the second group of 2-bit parts in the examples, they could equally well appear at the end of an instruction with 3 or less operations. In such a case the second group of 2-bit parts would not be needed.

There is no fixed relationship between the position of operations in the instruction and the issue slot in which they are issued. This makes it possible to make an instruction shorter when not all issue slots are used. Operation positions are filled from left to right. The Format section of the instruction indicates to which issue slot a particular operation belongs. For instance, if any instruction contains only one operation, then it is located in the first operation position and it can be issued to any issue slot, not just slot number 1. The decompression hardware takes care of routing operation to their proper issue slots.

No padding bytes are allowed between instructions that form one sequential block of code. Padding blocks are allowed between distinct blocks of code.

5. Format Bits

Figure 3:
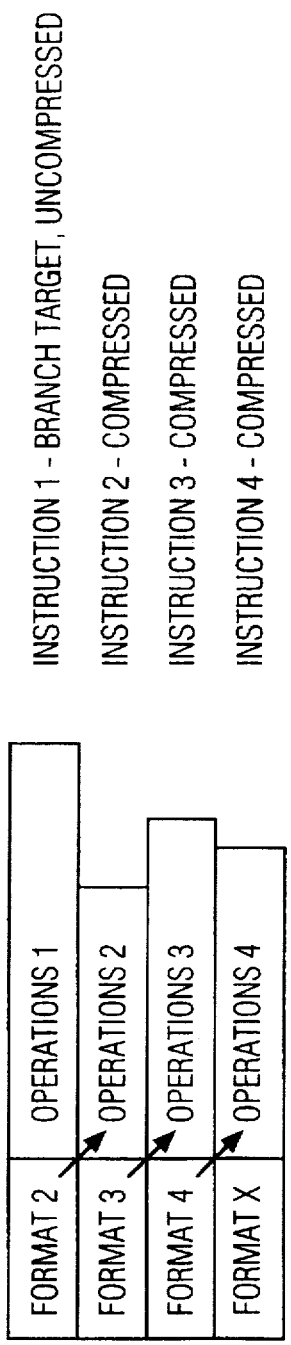
FIG. 3 illustrates a part of the compression scheme in accordance with the invention.

The instruction compression technique of the invention is characterized by the use of a format field which specifies which issue slots are to be used by the compressed instruction. To achieve retrieval efficiency, format bits are stored in the instruction preceding the instruction to which the format bits relate. This allows pipelining of instruction retrieval. The is decompression unit is alerted to how many issue slots to expect in the instruction to follow prior to retrieval of that instruction. The storage of format bits preceding the operations to which they relate is illustrated in FIG. 3. Instruction 1, which is an uncompressed branch target, contains a format field which indicates the issue slots used by the operations specified in instruction 2. Instructions 2 through 4 are compressed. Each contains a format field which specifies issue slots to be used by the operations of the subsequent instruction.

The format bits are encoded as follows. There are 2*N format bits for an N-issue slot machine. In the case of the preferred embodiment, there are five issue slots. Accordingly, there are 10 format bits. Herein the format bits will be referred to in matrix notation as Format [j] where j is the bit number. The format bits are organized in N groups of 2 bits. Bits Format [2i] and Format [2i+1] give format information about issue slot i, where 0≦i≦N. The meaning of the format bits is explained in the following table:

TABLE I

| Format [2i] lsb | Format [2i + 1] msb | meaning |
|---|---|---|
| 0 | 0 | Issue slot i is used and an operation for it is available in the instruction. The operation size is 26 bits. The size of the extension is 0 bytes |
| 1 | 0 | Issue slot i is used and an operation for it is available in |

TABLE I-continued

| Format [2i] lsb | Format [2i + 1] msb | meaning |
|---|---|---|
| | | the instruction. The operation size is 34 bits. The size of the extension is 1 byte. |
| 0 | 1 | Issue slot i is used and an operation for it is available in the instruction. The operation size is 42 bits. The size of the extension is 2 bytes. |
| 1 | 1 | Issue slot i is unused and no operation for it is included in the instruction. |

Operations correspond to issue slots in left to right order. For instance, if 2 issue slots are used, and Format={1, 0, 1, 1, 1, 1, 1, 0, 1, 1}, then the instruction contains two 34 bit operations. The left most is routed to issue slot 0 and the right most is routed to issue slot 3. If Format={1, 1, 1, 1, 1, 0, 1, 0, 1, 0}, then the instruction contains three 34 bit operations, the left most is routed to issue sot 2, the second operation is intended for issue slot 3, and the right most belongs to issue slot 4.

The format used to decompress branch target instructions is a constant. Constant_Format={0, 1, 0, 1, 0, 1, 0, 1, 0, 1} for the preferred five issue slot machine.

6. Operation Formats

The format of an operation depends on the following properties zeroary, unary, or binary;

parametric or non-parametric. Parametric instructions contain an immediate operand in the code. Parameters can be of differing sizes. Here there are param7, i.e. seven bit parameters, and param32, i.e. 32 bit parameters.

result producing or resultless;

long or short op code. The short op codes are the 32 most frequent op codes and are five bits long. The long op codes are eight bits long and include all of the op codes, including the ones which can be expressed in a short format. Op codes 0 to 31 are reserved for the 32 short op codes guarded or unguarded. An unguarded instruction has a constant value of the guard of TRUE.

latency. A format bit indicates if operations have latency equal to one or latency larger than 1.

signed/unsigned. A format bit indicates for parametric operations if the parameter is signed or unsigned.

The guarded or unguarded property is determined in the uncompressed instruction format by using the special register file address of the constant 1. If a guard address field contains the address of the constant 1, then the operation is unguarded, otherwise it is guarded. Most operations can occur both in guarded and unguarded formats. An immediate operation, i.e. an operation which transfers a constant to a register, has no guard field and is always unguarded.

Which op codes are included in the list of 32 short op codes depends on a study of frequency of occurrence which could vary depending on the type of software written.

The table II below lists operation formats used by the invention. Unless otherwise stated, all formats are: not parametric, with result, guarded, and long op code. To keep the tables and figures as simple as possible the following table does not list a special form for latency and signed/unsigned properties. These are indicated with L and S in the format descriptions. For non-parametric, zeroary operations, the unary format is used. In that case the field for the argument is undefined.

TABLE II

| OPERATION TYPE | SIZE |
|---|---|
| <binary-unguarded-short> | 26 |
| <unary-param7-unguarded-short> | 26 |
| <binary-unguarded-param7-resultless-short> | 26 |
| <unary-short> | 26 |
| <binary-short> | 34 |
| <unary-param7-short> | 34 |
| <binary-param7-resultless-short> | 34 |
| <binary-unguarded> | 34 |
| <binary-resultless> | 34 |
| <unary-param7-unguarded> | 34 |
| <unary> | 34 |
| <binary-param7-resultless> | 42 |
| <binary> | 42 |
| <unary-param7> | 42 |
| <zeroary-param32> | 42 |
| <zeroary-param32-resultless> | 42 |

For all operations a 42-bit format is available for use in branch targets. For unary and binary-resultless operations, the <binary> format can be used. In that case, unused fields in the binary format have undefined values. Short 5-bit op codes are converted to long 8-bit op codes by padding the most significant bits with 0's. Unguarded operations get as a guard address value, the register file address of constant TRUE. For store operations the 42 bit, binary-param7-resultless> format is used instead of the regular 34 bit <binary-param7-resultless short> format (assuming store operations belong to the set of short operations).

Operation types which do not appear in table II are mapped onto those appearing in table II, according to the following table of aliases:

TABLE II

| FORMAT | ALIASED TO |
|---|---|
| zeroary | unary |
| unary_resultless | unary |
| binary_resultless_short | binary_resultless |
| zeroary_param32_short | zeroary_param32 |
| zeroary_param32_resultless_short | zeroary_param32_resultless |
| zeroary_short | unary |
| unary_resultless_short | unary |
| binary_resultless_unguarded | binary_resultless |
| unary_unguarded | unary |
| binary_param7_resultless_unguarded | binary_param7_resultless |
| unary_unguarded | unary |
| binary_param7_resultless_unguarded | binary_param7_resultless |
| zeroary_unguarded | unary |
| unary_resultless_unguarded_short | binary_unguarded_short |
| unary_unguarded_short | unary_short |
| zeroary_param32_unguarded_short | zeroary_param32 |
| zeroary_parame32_resultless_unguarded_short | zeroary_param32_resultless |
| zeroary_unguarded_short | unary |
| unary_resultless_unguarded_short | unary |
| unary_long | binary |
| binary_long | binary |
| binary_resultless_long | binary |
| unary_param7_long | unary_param7 |
| binary_param7_resultless_long | binary_param7_resultless |
| zeroary_param32_long | zeroary_param32 |
| zeroary_param32_resultless_long | zeroary_param32_resultless |
| zeroary_long | binary |
| unary_resultless_long | binary |

The following is a table of fields which appear in operations:

TABLE III

| FIELD | SIZE | MEANING |
|---|---|---|
| src1 | 7 | register file address of first operand |
| src2 | 7 | register file address of second operand |
| guard | 7 | register file address of guard |
| dst | 7 | register file address of result |
| param | 7/32 | 7 bit parameter or 32 bit immediate value |
| op code | 5/8 | 5 bit short op code or 8 bit long op code |

FIG. 5 includes a complete specification of the encoding of operations.

7. Extensions of the instruction format

Within the instruction format there is some flexibility to add new operations and operation forms, as long as encoding within a maximum size of 42 bits is possible.

The format is based on 7-bit register file address. For register file addresses of different sizes, redesign of the format and decompression hardware is necessary.

The format can be used on machines with varying numbers of issue slots. However, the maximum size of the instruction is constrained by the word size in the instruction cache. In a 4 issue slot machine the maximum instruction size is 22 bytes (176 bits) using four 42-bit operations plus 8 format bits. In a five issue slot machine, the maximum instruction size is 28 bytes (224 bits) using five 42-bit operations plus 10 format bits.

In a six issue slot machine, the maximum instruction size would be 264 bits, using six 42-bit operations plus 12 format bits. If the word size is limited to 256 bits, and six issue slots are desired, the scheduler can be constrained to use at most 5 operations of the 42 bit format in one instruction. The fixed format for branch targets would have to use 5 issue slots of 42 bits and one issue slot of 34 bits.

Compressing the Instructions

Figure 8:
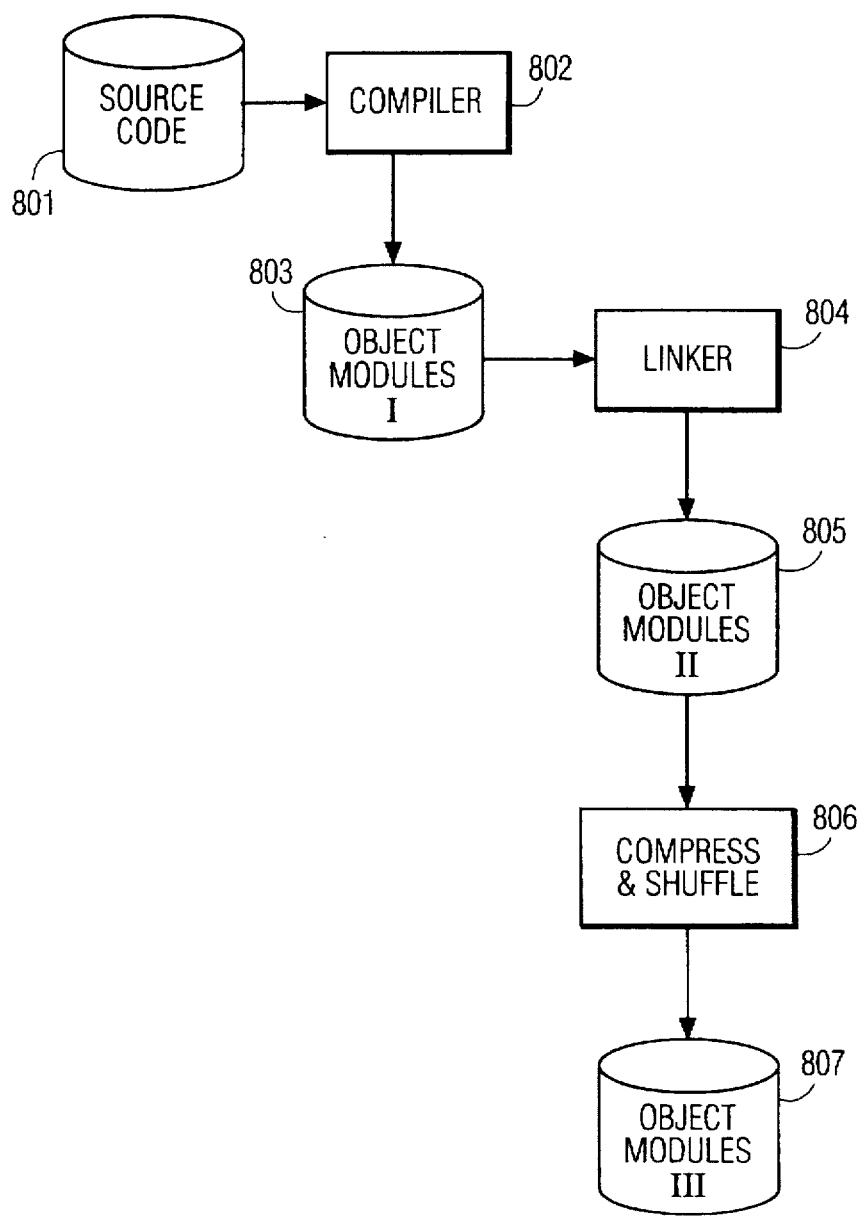
FIG. 8 illustrates compilation and linking of code according to the invention.

FIG. 8 shows a diagram of how source code becomes a loadable, compressed object module. First the source code 801 must be compiled by compiler 802 to create a first set of object modules 803. These modules are linked by linker 804 to create a second type of object module 805. This module is then compressed and shuffled at 806 to yield loadable module 807. Any standard compiler or linker can be used. Appendix D gives some background information about the format object modules in the environment of the invention. Object modules II contain a number of standard data structures. These include: a header; global & local symbol tables; reference table for relocation information; a section table; and debug information, some of which are used by the compression and shuffling module 807. The object module II also has partitions, including a text partition, where the instructions to be processed reside, and a source partition which keeps track of which source files the text came from.

Figure 9:
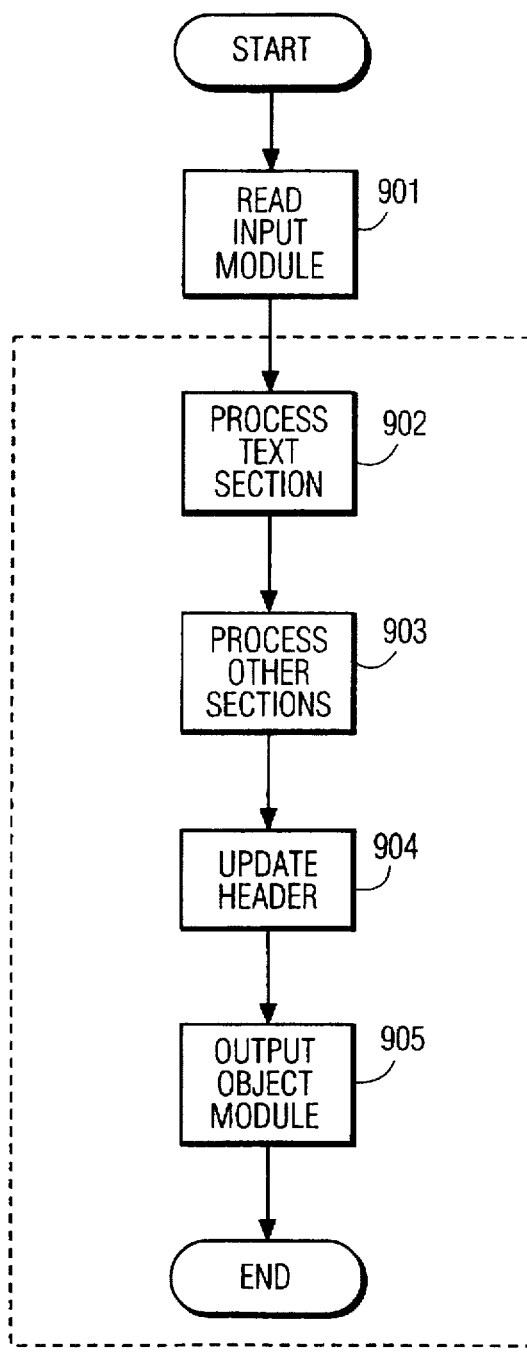
FIG. 9 is a flow chart of compression and shuffling modules.

A high level flow chart of the compression and shuffling module is shown at FIG. 9. At 901, object module II is read in. At 902 the text partition is processed. At 903 the other sections are processed. At 904 the header is updated. At 905, the object module is output.

Figure 10:
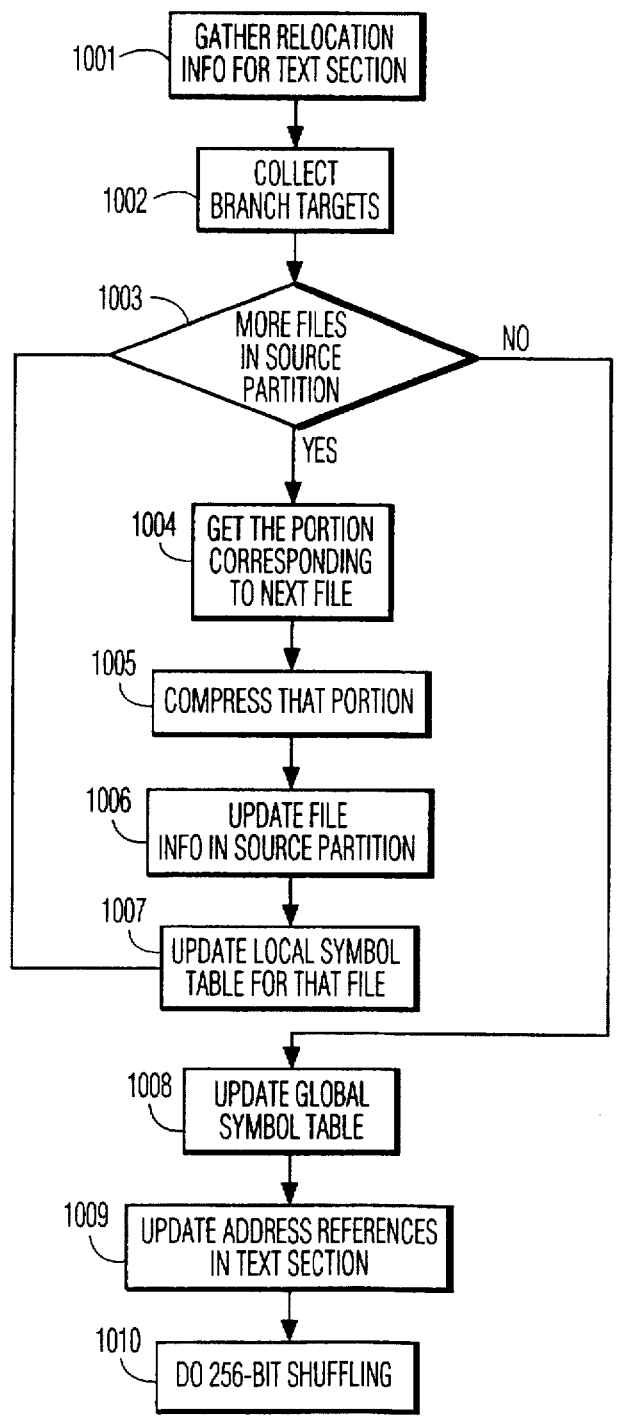
FIG. 10 expands box 902 of FIG. 9.

FIG. 10 expands box 902. At 1001, the reference table, i.e. relocation information is gathered. At 1002, the branch targets are collected, because these are not to be compressed. At 1003, the software checks to see if there are more files in the source partition. If so, at 1004, the portion corresponding to the next file is retrieved. Then, at 1005, that portion is compressed. At 1006, file information in the source partition is updated. At 1007, the local symbol table is updated.

Once there are no more files in the source partition, the global symbol table is updated at 1008. Then, at 1009, address references in the text section are updated. Then at 1010, 256-bit shuffling is effected. Motivation for such shuffling will be discussed below.

Figure 11:
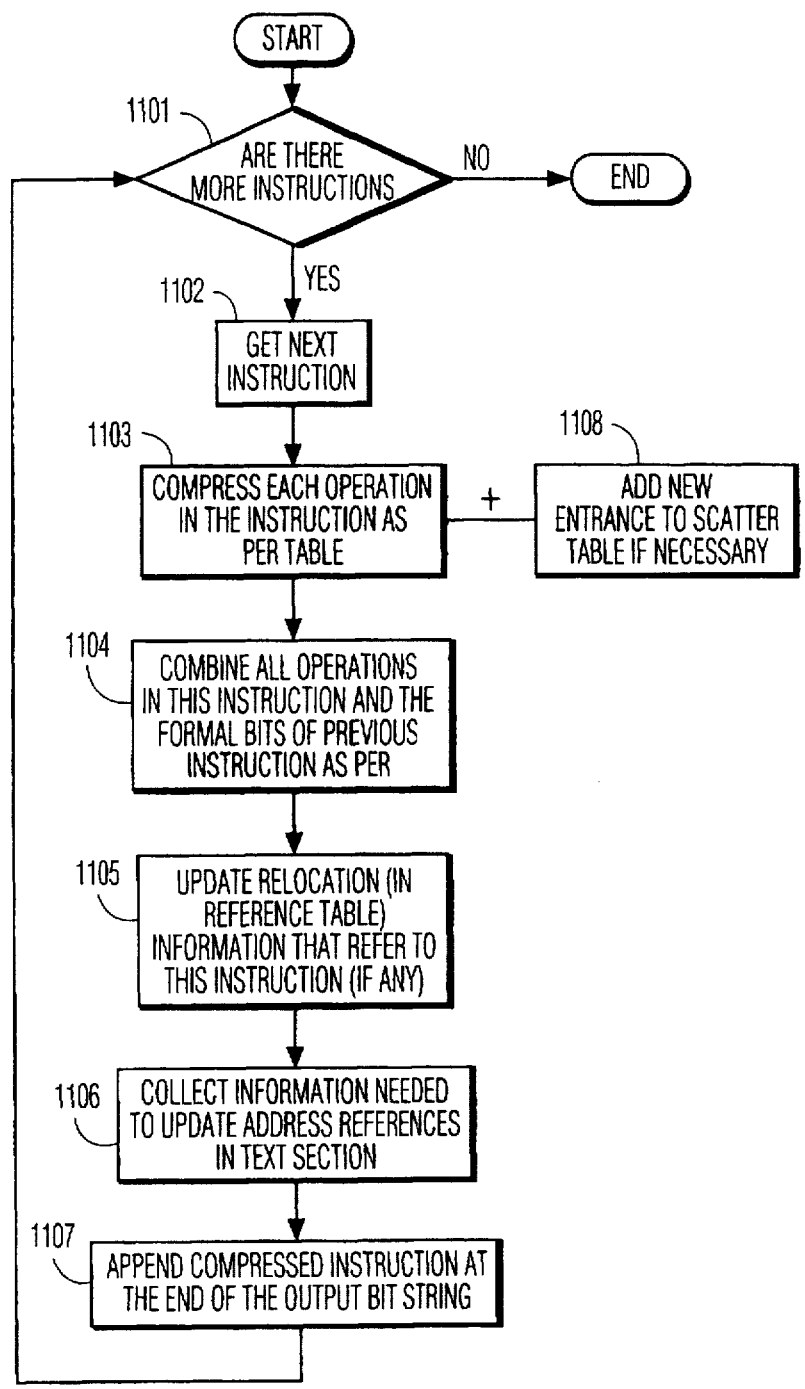
FIG. 11 expands box 1005 of FIG. 10.

FIG. 11 expands box 1005. First, it is determined at 1101 whether there are more instructions to be compressed. If so, a next instruction is retrieved at 1102. Subsequently each operation in the instruction is compressed at 1103 as per the tables in Figs. 5a and 5b and a scatter table is updated at 1108. The scatter table is a new data structure, required as a result of compression and shuffling, which will be explained further below. Then, at 1104, all of the operations in an instruction and the format bits of a subsequent instruction are combined as per FIGS. 4a–4e. Subsequently the relocation information in the reference table must be updated at 1105, if the current instruction contains an address. At 1106, information needed to update address references in the text section is gathered. At 1107, the compressed instruction is appended at the end of the output bit string and control is returned to box 1101. When there are no more instructions, control returns to box 1006.

Appendices B and C are source code appendices, in which the functions of the various modules are as listed below:

TABLE IV

| Name of module | identification of function performed |
| --- | --- |
| scheme_table | readable version of table of FIGS. 5a and 5b |
| comp_shuffle.c | 256-bit shuffle, see box 1010 |
| comp_scheme.c | boxes 1103–1104 |
| comp_bitstring.c | boxes 1005 & 1009 |
| comp_main.c | controls main flow of FIGS. 9 and 10 |
| comp_src.c, comp_reference.c, comp_misc.c, comp_btarget.c | miscellaneous support routines for performing other functions listed in FIG. 11 |

The scatter table, which is required as a result of the compression and shuffling of the invention, can be explained as follows.

The reference table contains a list of locations of addresses used by the instruction stream and corresponding list of the actual addresses listed at those locations. When the code is compressed, and when it is loaded, those addresses must be updated. Accordingly, the reference table is used at these times to allow the updating.

However, when the code is compressed and shuffled, the actual bits of the addresses are separated from each other and reordered. Therefore, the scatter table lists, for each address in the reference table, where EACH BIT is located. In the preferred embodiment the table lists, a width of a bit field, an offset from the corresponding index of the address in the source text, a corresponding offset from the corresponding index in the address in the destination text.

When object module III is loaded to run on the processor, the scatter table allows the addresses listed in the reference table to be updated even before the bits are deshuffled.

Decompressing the Instructions

Figure 12:
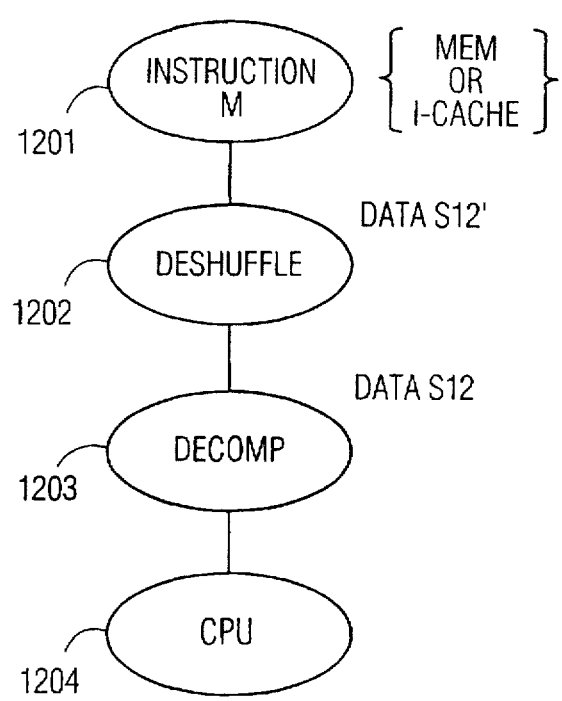
FIG. 12 illustrates the decompression process.

In order for the VLIW processor to process the instructions compressed as described above, the instructions must be decompressed. After decompression, the instructions will fill the instruction register, which has N issue slots, N being 5 in the case of the preferred embodiment. FIG. 12 is a schematic of the decompression process. Instructions come from memory 1201, i.e. either from the main memory 104 or the instruction cache 105. The instructions must then be deshuffled 1201, which will be explained further below, before being decompressed 1203. After decompression 1203, the instructions can proceed to the CPU 1204.

Each decompressed operation has 2 format bits plus a 42 bit operation. The 2 format bits indicate one of the four possible operation lengths (unused issue slot, 26-bit, 34-bit, or 42-bit). These format bits have the same values is "Format" in section 5 above. If an operation has a size of 26 or 34 bits, the upper 8 or 16 bits are undefined. If an issue slot is unused, as indicated by the format bits, then all operation bits are undefined and the CPU has to replace the op code by a NOP op code (or otherwise indicate NOP to functional units). Formally the decompressed instruction format is <decompressed instruction> : := {<decompressed operation>}N
<decompressed operation> : :=<operation:42><format:2>

Operations have the format as in Table III (above).

Appendix A is VERILOG code which specifies the functioning of the decompression unit. VERILOG code is a standard format used as input to the VERILOG simulator produced by Cadence Design Systems, Inc. of San Jose, Calif. The code can also be input directly to the design compiler made by Synopsys of Mountain View, Calif. to create circuit diagrams of a decompression unit which will decompress the code. The VERILOG code specifies a list of pins of the decompression unit these are

TABLE V

| # of pins in group | name of group of pins | description of group of pins |
| --- | --- | --- |
| 512 | data512 | 512 bit input data word from memory, i.e. either from the instruction cache or the main memory |
| 32 | pc | input program counter |
| 44 | operation4 | output contents of issue slot 4 |
| 44 | operation3 | output contents of issue slot 3 |
| 44 | operation2 | output contents of issue slot 2 |
| 44 | operation1 | output contents of issue slot 1 |
| 44 | operation0 | output contents of issue slot 0 |
| 10 | format_out | output duplicate of format bits in operations |
| 32 | first_word | output first 32 bits pointed to by program counter |
| 1 | format_ctrl0 | is it a branch target or not? |
| 1, each | reissue1 stall_in freeze reset clk | input global pipeline control signals |

Data512 is a double word which contains an instruction which is currently of interest. In the above, the program counter, PC is used to determine data512 according to the following algorithm:

```
A:={PC[31:8],8'b0}
if PC[5] = 0 then
    data512' := {M(A), M(A+32)}
else data512':= {M(A+32), M(A)}
``` where

A is the address of a single word in memory which contains an instruction of interest;

8'b0 means 8 bits which are zeroed out

M(A) is a word of memory addressed by A;

M(A+32) is word of memory addressed by A+32;

data512' is the shuffled version of data 512

This means that words are swapped if an odd word is addressed.

Operations are delivered by the decompression unit in a form which is only partially decompressed, because the operation fields are not always in the same bit position. Some further processing has to be done to extract the operation fields from their bit position, most of which can be done best in the instruction decode stage of the CPU pipeline. For every operation field this is explained as follows:

src1

The src1 field is in a fixed position and can be passed directly to the register file as an address. Only the 32-bit immediate operation does not use the src1 field. In this case the CPU control will not use the src1 operand from the register file.

src2

The src2 field is in a fixed position if it is used and can be passed directly to the register file as address. If it is not used it has an undefined value. The CPU control makes sure that a "dummy" src2 value read from the register file is not used.

guard

The guard field is in a fixed position if it is used and can be passed directly to the register file as an address. Simultaneously with register file access, the CPU control inspects the op code and format bits of the operation. If the operation is unguarded, the guard value read from the RF (register file) is replaced by the constant TRUE.

op code

Short or long op code and format bits are available in a fixed position in the operation. They are in bit position 21–30 plus the 2 format bits. They can be fed directly to the op code decode with maximum time for decoding.

dst

The dst field is needed very quickly in case of a 32-bit immediate operation with latency 0. This special case is detected quickly by the CPU control by inspecting bit 33 and the formal bits. In all other cases there is a full clock cycle available in the instruction decode pipeline state to decode where the dst field is in the operation (it can be in many places) and extract it.

32-bit immediate

If there is a 32-bit immediate it is in a fixed position in the operation. The 7 least significant bits are in the src2 field in the same location as a 7-bit parameter would be.

7-bit parameter

If there is a 7-bit parameter it is in the src2 field of the operation. There is one exception: the store with offset operation. For this operation, the 7-bit parameter can be in various locations and is multiplexed onto a special 7-bit immediate bus to the data cache.

Bit Swizzling

Where instructions are long, e.g. 512 bit double words, cache structure becomes complex. It is advantageous to swizzle the bits of the instructions in order to simplify the layout of the chip. Herein, the words swizzle and shuffle are used to mean the same thing. The following is an algorithm for swizzling bits, see also comp__shuffle.c in the source code appendix.

```
for (k=0; k<4; k=k+1)
    for (i=0; i<8; i=i+1)
        for (j=0; j<8; j=j+1)
        begin
            word_shuffled[k*64+j*8+i] =
                word_unshuffled[(4*i+k)*8 + j]
        end
``` where i, j, and k are integer indices; word__shuffled is a matrix for storing bits of a shuffled word; and word__ unshuffled is matrix for storing bits of an unshuffled word.

Cache Structure

Figure 6A:
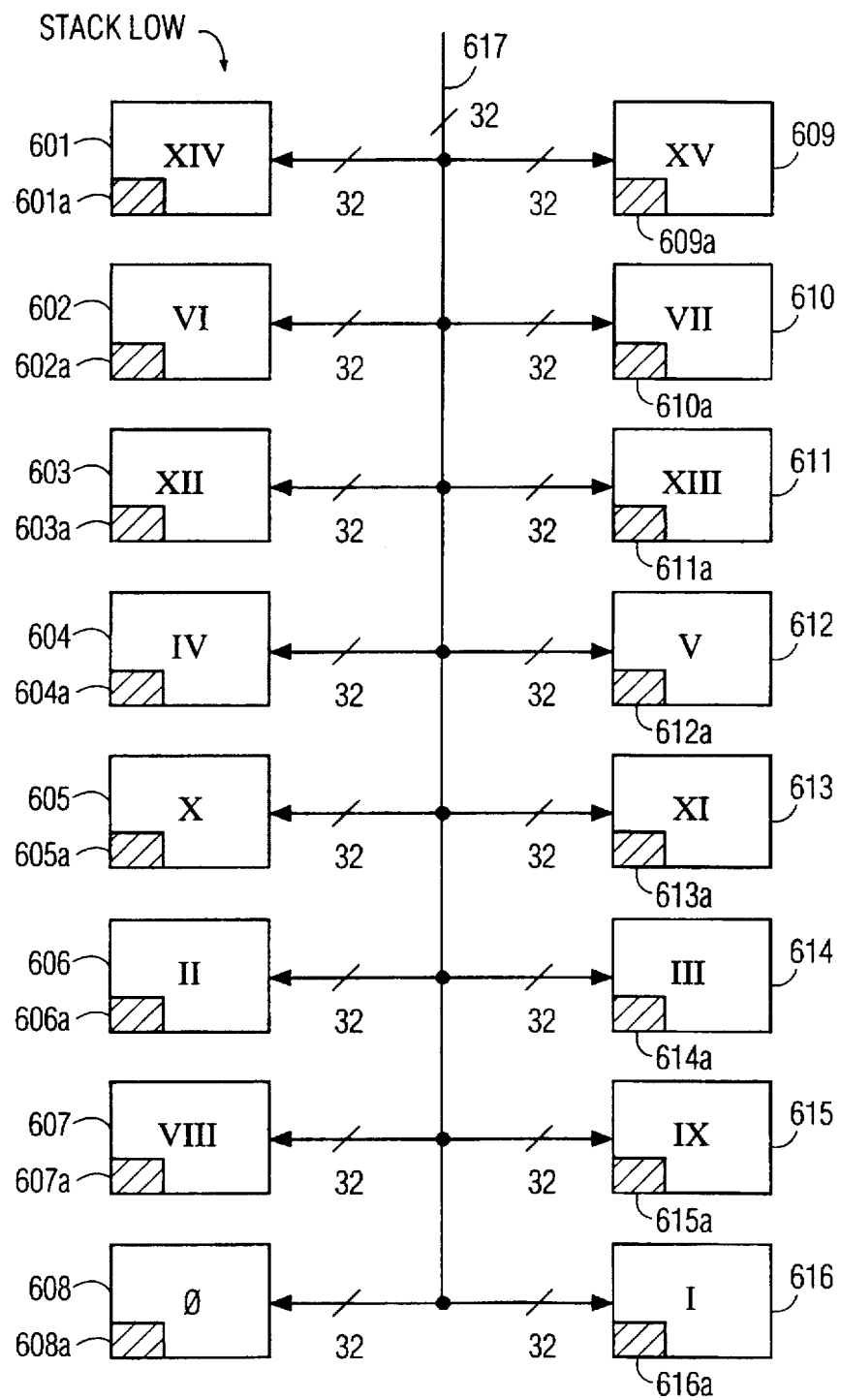
FIG. 6a is a schematic showing the functioning of instruction cache 103 on input.

FIG. 6a shows the functioning on input of a cache structure which is useful in efficient processing of VLIW instructions. This cache includes 16 banks 601–616 of 2 k bytes each. These banks share an input bus 617. The caches are divided into two stacks. The stack on the left will be referred to as "low" and the stack on the right will be referred to as "high".

The cache can take input in only one bank at a time and then only 4 bytes at a time. Addressing determines which 4 bytes of which bank are being filled. For each 512 bit word to be stored in the cache, 4 bytes are stored in each bank. A shaded portion of each bank is illustrated indicating corresponding portions of each bank for loading of a given word. These shaded portions are for illustration only. Any given word can be loaded into any set of corresponding portions of the banks.

After swizzling according to the algorithm indicated above, sequential 4 byte portions of the swizzled word are loaded into the banks in the following order 608, 616, 606, 614, 604, 612, 602, 610, 607, 615, 605, 613, 603, 611, 601, 609. The order of loading of the 4 byte sections of the swizzled word is indicated by roman numerals in the boxes representing the banks.

Figure 6B:
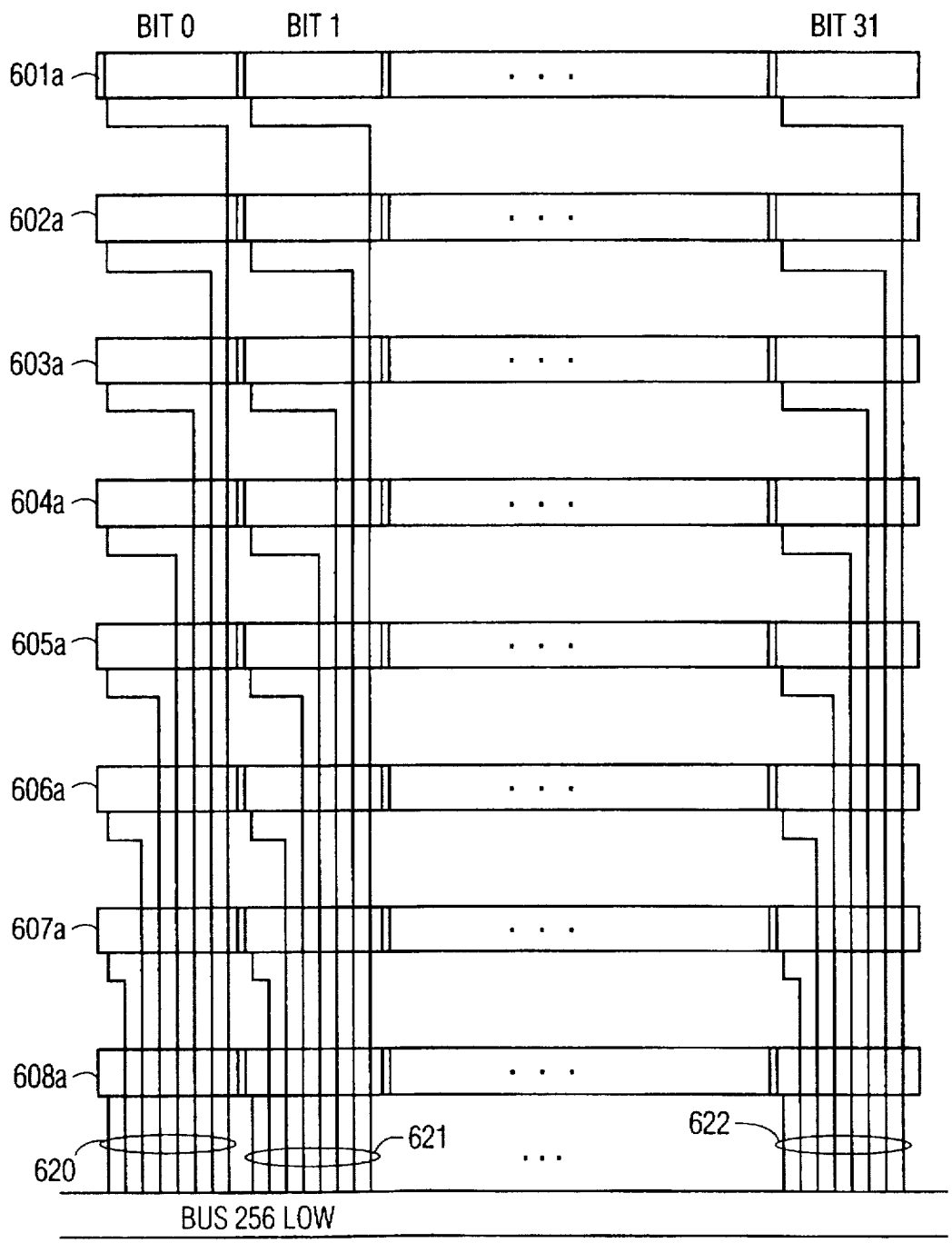
FIG. 6b is a schematic showing the functioning of a portion of the instruction cache 103 on output.

FIG. 6b shows how the swizzled word is read out from the cache. FIG. 6b shows only the shaded portions of the banks of the low stack. The high portion is analogous. Each shaded portion 601a–608a has 32 bits. The bits are loaded onto the output bus, called bus256low, using the connections shown, i.e. in the following order: 608a-bit0, 607a-bit 0, . . . , 601a-bit 0; 608a-bit 1, 607a-bit1, . . . , 601a-bit 1; . . . ; 608a-bit 31, 607a-bit 31, . . . , 601a-bit 31. Using these connections, the word is automatically de-swizzled back to its proper bit order.

Figure 7:
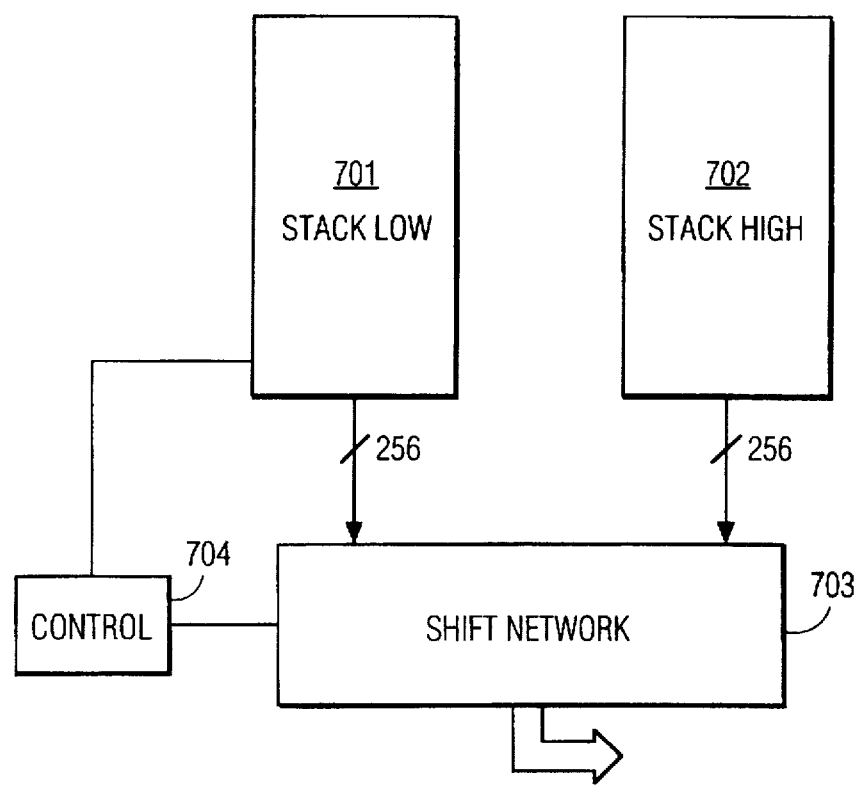
FIG. 7 is a schematic showing the functioning of instruction cache 104 on output.

The bundles of wires, 620, 621, . . . , 622 together form the output bus256 low. These wires pass through the cache to the output without crossing On output, the cache looks like FIG. 7. The bits are read out from stack low 701 and stack high 702 under control of control unit 704 through a shift network 703 which assures that the bits are in the output order specified above. In this way the entire output of the 512 bit word is assured without bundles 620, 621, . . . 622 and analogous wires crossing.

We claim:

1. Computer software, stored in a computer storage medium, for producing compressed code for running on a VLIW processor, the software comprising code for receiving a compiled and linked object module produced by a compiler and/or linker, which object module is stored in a computer storage medium ; and code for compressing the compiled and linked software to produce a second object module which second object module is stored in a computer storage medium, which second object module includes a stored instruction, which instruction comprises a plurality of operations, each operation being compressed according to a compression scheme which assigns a compressed operation length to that operation, the compressed operation length being chosen from a plurality of finite lengths, which finite lengths include at least two non-zero lengths, which of the finite lengths is chosen being dependent upon at least one feature of the operation.

2. The software of claim 1 wherein the set of operation lengths is {0, 26, 34, 42}.

3. The software of claim 1 wherein the at least one feature is at least one of the following:

abbreviated op code;

guarded or unguarded;

resultless;

immediate parameter with fixed number of bits; and zeroary, unary, or binary.

4. The software of claim 3 wherein combined operation types are aliased according to the following table

| FORMAT | ALIASED TO |
| --- | --- |
| zeroary | unary |
| unary_resultless | unary |
| binary_resultless_short | binary_resultless |
| zeroary_param32_short | zeroary_param32 |
| zeroary_param32_resultless_short | zeroary_param32_resultless |
| zeroary_short | unary |
| unary_resultless_short | unary |
| binary_resultless_unguarded | binary_resultless |
| unary_unguarded | unary |
| binary_param7_resultless_unguarded | binary_param7_resultless |
| unary_unguarded | unary |
| binary_param7_resultless_unguarded | binary_param7_resultless |
| zeroary_unguarded | unary |
| unary_resultless_unguarded_short | binary_unguarded_short |
| unary_unguarded_short | unary_short |
| zeroary_param32_unguarded_short | zeroary_param32 |
| zeroary_parame32_resultless_unguarded_short | zeroary_param32_resultless |
| zeroary_unguarded_short | unary |
| unary_resultless_unguarded_short | unary |
| unary_long | binary |
| binary_long | binary |
| binary_resultless_long | binary |
| unary_param7_long | unary_param7 |
| binary_param7_resultless_long | binary_param7_resultless |
| zeroary_param32_long | zeroary_param32 |
| zeroary_param32_resultless_long | zeroary_param32_resultless |
| zeroary_long | binary |
| unary_resultless_long | binary |

5. The software of claim 3, wherein the fixed number is one of 7 and 32.

6. The software of claim 1 comprising a plurality of such instructions, of which one instruction is a branch target, which one instruction is not compressed.

7. The software of claim 1 wherein each operation field within each instruction includes a sub-field specifying at least one of the following: a register file address of a first operand; a register file address of a second operand; a register file address of guard information; a register file address of a result; an immediate parameter; and an op code.

8. The software of claim 1 comprising a plurality of such instructions, each instruction comprising a format field for specifying a plurality of respective formats, one respective format for each operation of a succeeding instruction.

9. The software of claim 8, wherein the compressed format comprises a format field specifying issue slots of the VLIW processor to be used by some instruction.

10. The software of claim 9 comprising at least one field specifying the operation.

11. The software of 9 wherein the format field has 2*N bits, where N is the number of issue slots.

12. The software of 10 wherein the at least one field specifying the operation comprises at least one byte aligned sub-field.

13. The software of claim 10 further comprising at least one operation part sub-field located in a same byte with the format field.

14. The software of claim 9 wherein the instruction takes up no more than 32 bytes.

15. The software of claim 1 comprising a plurality of such instructions, wherein at least two of the instructions have different lengths.

16. The software of claim 1 wherein the instruction is aligned with a byte boundary, but not a word boundary.

17. The software of claim 13 wherein the format field specifies that more than a threshold quantity of issue slots are to be used and further comprising at least one first operation part sub-field located in a same byte with the format field, a plurality of sub-fields specifying operations, and at least one second operation part sub-field located in a byte separate from the other sub-fields.

18. The software of claim 9 formatted as follows

```
<instruction> : :=
   <instruction start>
   <instruction middle>
   <instruction end>
   <instruction extension>
<instruction start> : :=
   <Format:2*N>{<padding:1>}V2{<2-bit operation part:2>}V1{<24-
   bit operation part :24>}V1
<instruction middle> : := {{<2-bit operation part:2>}4 {24-bit
   operation part:24>}4}V3
<instruction end> : := {<padding:1>}V5{<2-bit operation
   part:2>}V4 {24-bit operation part:24>}V4
<instruction extension>: :={<operationextension:0/8/16>}S
<padding>: := "0"
```

Wherein the variables used above are defined as follows:

N=the number of issue slots of the machine, N>0

S=the number of issue slots used in this instruction (0<S<N)

C1=4−(N mod 4)

If (S<C1) then V1=S and V2=2*(C1−V1)

If (S>C1) then V1=C1 and V2=0

V3=(S−V1) div 4

V4=(S−V1) mod 4

If (V4>0) then V5=2*(4−V4) else V5=0

Explanation of notation

| | | |
| --- | --- | --- |
| : := | means | "is defined as" |
| <field name:number> | | |
| | means | the field indicated before the colon has |

| {<field name>}number |  | the number of bits indicated after the colon. |
|---|---|---|
|  | means | the field indicated in the angle brackets and braces is repeated the number of times indicated after the braces |
| "0" | means | the character "0" |
| "div" | means | integer divide |
| "mod" | means | modulo |
| :0/8/16 | means | that the field is 0, 8, or 16 bits long. |

19. The software of claim 9 containing an operation which is encoded in 26, 34 or 42 bits, wherein if the operation is 26 bits, it is one of
   binary unguarded short; p2 unary immediate 7-bit parameter unguarded operation;
   binary unguarded immediate 7-bit operand resultless short; and
   unary short;

if the operation is 34 bits, it is one of
   binary short;
   unary immediate 7-bit parameter resultless short;
   binary unguarded;
   unary immediate 7-bit parameter unguarded; and
   unary; and if the operation is encoded in 42 bits, it is one of
   binary immediate 7-bit parameter resultless;
   binary;
   unary immediate 7-bit parameter;
   zeroary immediate 32-bit parameter; and
   zeroary, immediate 32-bit parameter resultless.

20. The software of claim 9 wherein the operations are encoded according to the following table:

| | 24-bit operation part | | | | 2-bit part | Extension | Size |
|---|---|---|---|---|---|---|---|
| | | | bit position | | | | |
| name | 0–6 | 7–13 | 14–20 | 21–23 | 24–25 | 26–34–41 | |
| 26-format: | | | | | | | |
| <binary-unguarded-short> | src1[0:6] | src2[0:6] | dst[0:6] | opcode[0:2] | opcode[3:4] | | 26 |
| <unary-param7-unguarded-short> | src1[0:6] | param[0:6] | dst[0:6] | opcode[0:2] | opcode[3:4] | | 26 |
| <binary-unguarded-param7-resultless-short> | src1[0:6] | src2[0:6] | param[0:6] | opcode[0:2] | opcode[3:4] | | 26 |
| <unary-short> | src1[0:6] | dst[0:6] | guard[0:6] | opcode[0:2] | opcode[3:4] | | 26 |
| 34-format: | | | | | | | |
| <binary-short> | src1[0:6] | src2[0:6] | guard[0:6] | opcode[0:2] | opcode[3:4] | dst[0:6] 0 | 34 |
| <unary-param-7-short> | src1[0:6] | param[0:6] | guard[0:6] | opcode[0:2] | opcode[3:4] | dst[0:6] 0 | 34 |
| <binary-param7-resultless-short> | src1[0:6] | src2[0:6] | guard[0:6] | opcode[0:2] | opcode[3:4] | param [0:6] 0 | 34 |
| <binary-unguarded> | src1[0:6] | src2[0:6] | dst[0:6] | opcode[0.2] | opcode[3:4] | opcode[5:7] XL011 | 34 |
| <binary-resultless> | src1[0:6] | src2[0:6] | guard[0:6] | opcode[0:2] | opcode[3:4] | opcode[5:7] X1001 | 34 |
| <unary-param7-unguarded> | src1[0:6] | param[0:6] | dst[0:6] | opcode[0:2] | opcode[3:4] | opcode[5:7] SL111 | 34 |
| <unary> | src1[0:6] | dst[0:6] | guard[0:6] | opcode[0:2] | opcode[3:4] | opcode[5:7] XL101 | 34 |
| 42-format | | | | | | | |
| <binary-param7-resultless> | src1[0:6] | src2[0:6] | guard[0:6] | opcode[0:2] | opcode[3:4] | opcode[5:7] SXX100 param[0:6] | 42 |
| <binary> | src1[0:6] | src2[0:6] | guard{[0:6] | opcode[0:2] | opcode[3:4] | opcode[5:7] XL0101 dst[0:6] | 42 |
| <unary-param7> | src1[0:6] | param[0:6] | guard[0:6] | opcode[0:2] | opcode[3:4] | opcode[5:7] SL1101 dst[0:6] | 42 |
| <zeroary-param32> | param [7:13] | param[0:6] | dst[0:6] | param [14:16] | param [17:18] | param [19:23] XX1 param [24:31] | 42 |

-continued

| name | 24-bit operation part | | | | 2-bit part | Extension | Size |
|---|---|---|---|---|---|---|---|
| | bit position | | | | | | |
| | 0–6 | 7–13 | 14–20 | 21–23 | 24–25 | 26-34-41 | |
| <zeroary-param32-resultless> | param [7:13] | param[0:6] | guard[0:6] | param [14:16] | param [17:18] | param [19:23] 000 param [24:31] | 42 |
| <zeroary-param32-resultless> | param [7:13] | param[0:6] | guard[0:6] | param [14:16] | param [17:18] | param [19:23] 100 param [24:31] | 42 | wherein:

S: signed/unsigned format bit for parametric operations; S=1 if signed, S=0 if unsigned L: latency format bit; L=0 if (latency=1 and this is not a resultless operation) else L=1

X: undefined value.

21. Computer software, stored in a computer storage medium, for producing compressed code for running on VLIW processor, the software comprising code for receiving a compiled and linked object module produced by a compiler and/or linker, which object module is stored in a computer storage medium; and code for compressing the compiled and linked software to produce a second object module, which second object module is stored in a computer storage medium, which second object module includes a stream of instructions for execution on a VLIW processor, the stream of instructions comprising:

at least one first instruction which is a branch target and which is uncompressed; and at least one second instruction following the branch target which is compressed according to a scheme in which a format field located in one instruction specifies aspects of a type of compression applied to the succeeding instruction.

22. The software of claim 21 wherein the at least one first instruction is stored aligned with a word boundary.

23. The software of claim 21 wherein the at least one second instruction is stored unaligned with a word boundary.

24. The software of claim 21 wherein at least one of the at least one first instruction or the at least one second instruction specifies a plurality of operations for beginning in a same machine cycle.

* * * * *